(12) United States Patent
Chiu et al.

(10) Patent No.: US 10,678,481 B2
(45) Date of Patent: *Jun. 9, 2020

(54) ADAPTIVE CACHING AND DYNAMIC DELAY SCHEDULING FOR IN-MEMORY DATA ANALYTICS

(71) Applicant: International Business Machines Corporation, Armonk, NY (US)

(72) Inventors: Lawrence Y. Chiu, Saratoga, CA (US); Mohit Saxena, San Jose, CA (US); Erci Xu, Columbus, OH (US)

(73) Assignee: International Business Machines Corporation, Armonk, NY (US)

( * ) Notice: Subject to any disclaimer, the term of this patent is extended or adjusted under 35 U.S.C. 154(b) by 55 days.

This patent is subject to a terminal disclaimer.

(21) Appl. No.: 15/951,056

(22) Filed: Apr. 11, 2018

(65) Prior Publication Data
US 2018/0232153 A1 Aug. 16, 2018

Related U.S. Application Data

(63) Continuation of application No. 14/983,326, filed on Dec. 29, 2015, now Pat. No. 10,013,214.

(51) Int. Cl.
*G06F 3/06* (2006.01)
*G06F 16/00* (2019.01)
*G06F 16/182* (2019.01)

(52) U.S. Cl.
CPC ............ *G06F 3/067* (2013.01); *G06F 3/0604* (2013.01); *G06F 3/0643* (2013.01); *G06F 3/0644* (2013.01); *G06F 3/0655* (2013.01); *G06F 16/00* (2019.01); *G06F 16/182* (2019.01)

(58) Field of Classification Search
CPC ...... G06F 3/067; G06F 3/0604; G06F 3/0643; G06F 3/0644; G06F 3/0655; G06F 16/182; G06F 16/00
See application file for complete search history.

(56) References Cited

U.S. PATENT DOCUMENTS

| 9,686,086 | B1 * | 6/2017 | Nguyen | H04L 12/1822 |
| 9,952,894 | B1 * | 4/2018 | Cappiello | G06F 11/30 |
| 10,013,214 | B2 | 7/2018 | Chiu et al. | |
| 10,095,759 | B1 * | 10/2018 | Cappiello | G06F 16/25 |

(Continued)

OTHER PUBLICATIONS

List of IBM Patents or Patent Applications Treated as Related.
(Continued)

*Primary Examiner* — Ryan Bertram
(74) *Attorney, Agent, or Firm* — Zilka-Kotab, P.C.

(57) ABSTRACT

In various embodiments, computer-implemented techniques for improving function of in-memory processing systems via adaptively caching datasets include: identifying data stored in a distributed filesystem, the data including data to be processed by an in-memory processing application and data not to be processed by the in-memory processing application; identifying one or more partitions of the data corresponding to the data to be processed; and selectively transferring the one or more partitions from the distributed filesystem to a memory of the in-memory processing application. Corresponding systems and computer-program products are also disclosed.

18 Claims, 7 Drawing Sheets

(56) References Cited

U.S. PATENT DOCUMENTS

| | | | |
|---|---|---|---|
| 10,157,209 B1* | 12/2018 | Cappiello | G06F 16/24578 |
| 10,255,320 B1* | 4/2019 | Cappiello | G06F 16/245 |
| 2009/0019450 A1 | 1/2009 | Mori et al. | |
| 2010/0036890 A1* | 2/2010 | Kawamura | G06F 11/1458 |
| | | | 707/654 |
| 2011/0239013 A1 | 9/2011 | Muller | |
| 2013/0013552 A1* | 1/2013 | Eshleman | G06Q 10/00 |
| | | | 707/600 |
| 2014/0019613 A1 | 1/2014 | Ishikawa | |
| 2014/0068188 A1 | 3/2014 | Ebdon et al. | |
| 2014/0089331 A1 | 3/2014 | Sun et al. | |
| 2014/0281303 A1* | 9/2014 | Shau | G06F 16/2228 |
| | | | 711/161 |
| 2015/0149400 A1* | 5/2015 | Werner | G06F 16/283 |
| | | | 707/600 |
| 2016/0012108 A1* | 1/2016 | Hu | G06F 16/24532 |
| | | | 707/771 |
| 2016/0098292 A1* | 4/2016 | Boutin | G06F 9/505 |
| | | | 718/104 |
| 2016/0098662 A1* | 4/2016 | Voss | G06Q 10/06316 |
| | | | 705/7.26 |
| 2016/0316003 A1 | 10/2016 | Snider et al. | |
| 2017/0083444 A1 | 3/2017 | Dev et al. | |
| 2017/0185452 A1 | 6/2017 | Cao et al. | |
| 2017/0185511 A1 | 6/2017 | Chiu et al. | |
| 2018/0246788 A1* | 8/2018 | Hatasaki | G06F 16/128 |

OTHER PUBLICATIONS

Chiu et al., U.S. Appl. No. 14/983,326, filed Dec. 29, 2015.
Restriction Requirement from U.S. Appl. No. 14/983,326, dated Jul. 17, 2017.
Non-Final Office Action from U.S. Appl. No. 14/983,326, dated Oct. 13, 2017.
Notice of Allowance from U.S. Appl. No. 14/983,326, dated Mar. 1, 2018.
Corrected Notice of Allowance from U.S. Appl. No. 14/983,326, dated Mar. 27, 2018.

* cited by examiner

ADAPTIVE CACHING AND DYNAMIC DELAY SCHEDULING FOR IN-MEMORY DATA ANALYTICS

BACKGROUND

The present invention relates to in-memory data analytics, and more specifically, this invention relates to improving computational efficiency of in-memory data analytics by providing a unified cache and checkpoint functionality.

In-memory data analytics are an increasingly popular framework for processing data and providing various Internet-based services such as streaming applications, machine learning systems, graph-based analytics, maintaining structured query language (SQL) data sets and services, etc. As with any computational platform, the performance of these in-memory analytical frameworks is limited by the capabilities of the hardware components forming the framework, including the computational power of the processing nodes, storage capacity of memory, and input/output (I/O) bandwidth of various components.

For instance, any operation that requires transfer of data from local disk, remote memory, or remote disk to the local memory of a node, or even simply from local memory to in-process memory of the node processing data detrimentally contributes to the overall amount of time required to process a job.

Conventional approaches to in-memory processing have attempted to address this I/O detriment by using one or more caching techniques to manage the storage of data throughout processing. For example, compression/decompression techniques can reduce memory footprint of the dataset, but introduce additional I/O and processing time to compress/decompress the dataset. In addition, when decompression results in a dataset too large to fit in a processing node memory, spill-over to disk cache introduces additional processing delay associated with the corresponding I/O.

Caching between local and/or remote memory and disk-based storage can also manage the amount of data stored in a particular location, but the associated transfer operations needed to accomplish processing in local node memory are severely detrimental to the overall processing time for the job.

In addition, data being processed by a particular node using caching are generally not persistent, and data losses may delay or defeat the completion of a processing job, e.g. in the event of a failure of the processing node or critical components thereof (such as the memory storing the data).

To provide persistence, a distributed filesystem including a plurality of disk-based storage modules may be employed, and a snapshot of the state of data at a particular point in time may be captured at predetermined intervals to allow recovery of data in the event of a failure. However, these conventional techniques rely on storing the snapshot to lower-performance (high-reliability) hardware in a distributed filesystem, and retrieving snapshot data from a storage system detrimentally adds significant I/O and thus processing delay to the overall task.

For in-memory applications, especially those that function in whole or in part based on iteratively performing computations on a dataset, I/O and persistency are thus a significant contribution the functional performance of the in-memory processing system. Accordingly, it would be of great utility to provide systems, techniques, and computer program products capable of overcoming the traditional limitations imposed by conventional in-memory processing applications and improve the function of in-memory processing systems by enabling more computationally efficient I/O and data processing.

SUMMARY

In one embodiment, a computer-implemented method for adaptively caching datasets in an in-memory processing system includes: identifying data stored in a distributed filesystem, including data to be processed by an in-memory processing application and data not to be processed by the in-memory processing application; identifying one or more partitions of the data, the one or more partitions corresponding to the data to be processed by the in-memory processing application; and selectively transferring the one or more partitions from the distributed filesystem to a memory of the in-memory processing application.

In another embodiment, an in-memory processing system for adaptively caching datasets includes a processor and logic, executable by the processor, to cause the processor to: identify data stored in a distributed filesystem, the data including data to be processed by an in-memory processing application and data not to be processed by the in-memory processing application; identify one or more partitions of the data, the one or more partitions corresponding to the data to be processed by the in-memory processing application; and selectively transfer the one or more partitions from the distributed filesystem to a memory of the in-memory processing application.

In yet another embodiment, a computer program product for adaptively caching datasets in an in-memory processing system includes a computer readable storage medium having program instructions embodied therewith, wherein the computer readable storage medium is not a transitory signal per se, and the program instructions are executable by a processor, to cause the processor to perform a method. The method includes: identifying data stored in a distributed filesystem, including data to be processed by an in-memory processing application and data not to be processed by the in-memory processing application; identifying one or more partitions of the data, the one or more partitions corresponding to the data to be processed by the in-memory processing application; and selectively transferring the one or more partitions from the distributed filesystem to a memory of the in-memory processing application.

Other aspects and embodiments of the present invention will become apparent from the following detailed description, which, when taken in conjunction with the drawings, illustrate by way of example the principles of the invention.

DETAILED DESCRIPTION

Figure 1:
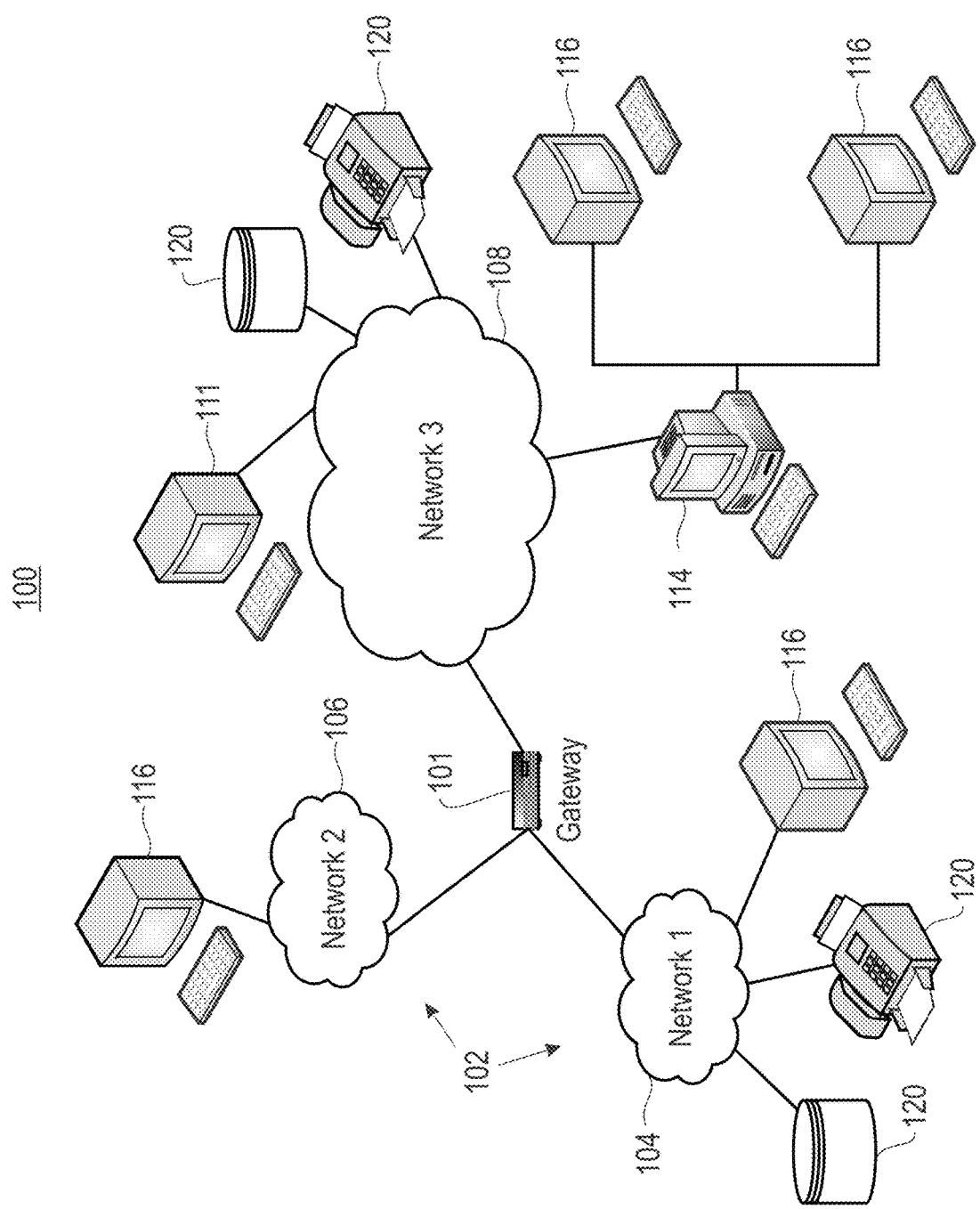
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for unified caching and checkpoint functionalities for in-memory data analytics.

As referenced herein, in-memory processing, and thus in-memory processing applications, analytics, etc. refer to processes that operate via processing data using a plurality of processing nodes of a cluster. The data being processed are stored in a memory of the node processing the data during the processing, and preferably the processing operation includes repetitively iterating over the data, such that I/O may have a significant impact on the overall processing time for a particular job. Exemplary in-memory processing applications may include graph analytics, streaming services, and machine learning applications, in various embodiments.

In one general embodiment, a computer-implemented method for adaptively caching datasets in an in-memory processing system includes: identifying data stored in a distributed filesystem, including data to be processed by an in-memory processing application and data not to be processed by the in-memory processing application; identifying one or more partitions of the data, the one or more partitions corresponding to the data to be processed by the in-memory processing application; and selectively transferring the one or more partitions from the distributed filesystem to a memory of the in-memory processing application.

In another general embodiment, a computer-implemented method for dynamic delay scheduling of jobs using an in-memory processing system includes: determining an average remote execution time of the in-memory processing system; tracking a waiting time of a job pending processing on a local node of the in-memory processing system; periodically comparing the tracked waiting time of the job pending processing; and demoting a locality of the job pending processing in response to determining the waiting time of the job pending processing exceeds the average remote execution time of the in-memory processing system.

In yet another general embodiment, a computer program product for dynamic delay scheduling of jobs using an in-memory processing system includes a computer readable storage medium having program instructions embodied therewith, where the computer readable storage medium is not a transitory signal per se. The program instructions are executable by a processor, to cause the processor to perform a method including: determining, by the processor, an average remote execution time of the in-memory processing system; tracking, by the processor, a waiting time of a job pending processing on a local node of the in-memory processing system; periodically comparing, by the processor, the tracked waiting time of the job pending processing; and demoting, by the processor, a locality of the job pending processing in response to determining the waiting time of the job pending processing exceeds the average remote execution time of the in-memory processing system.

General Networking and Tiered Storage Concepts

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
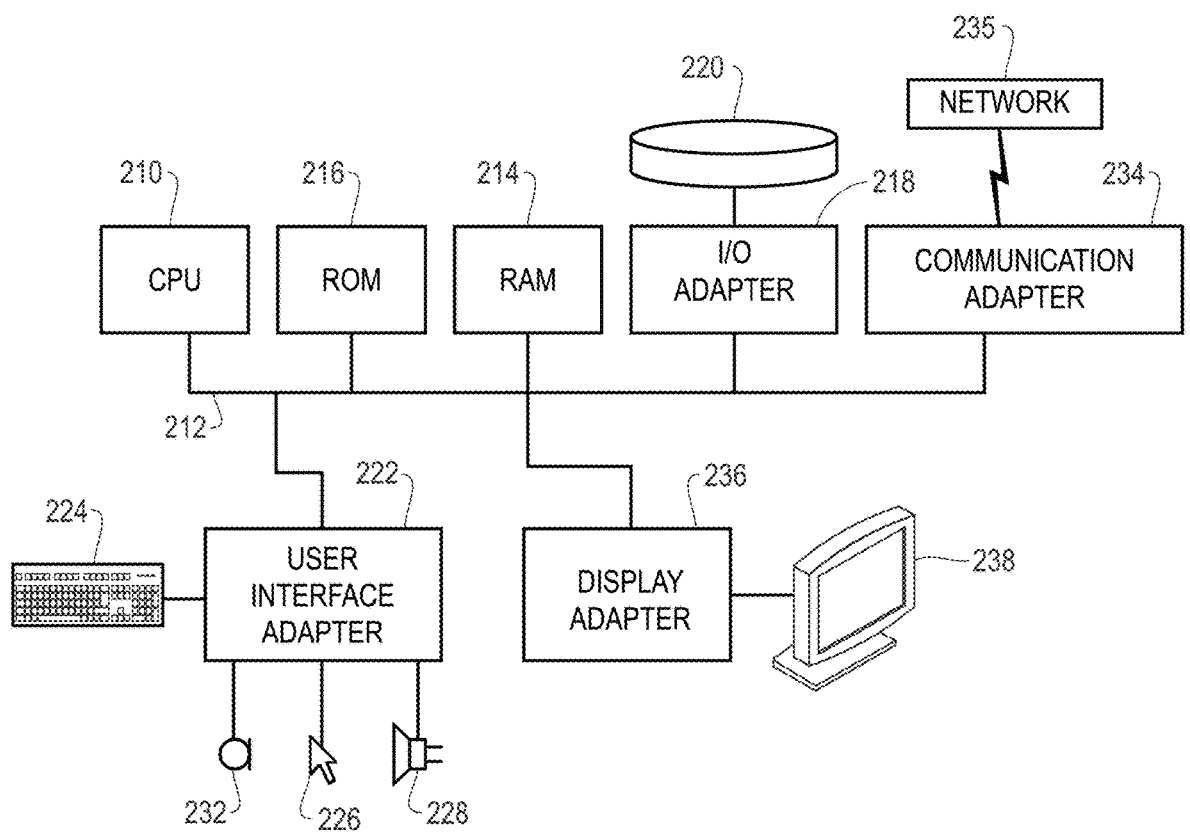
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
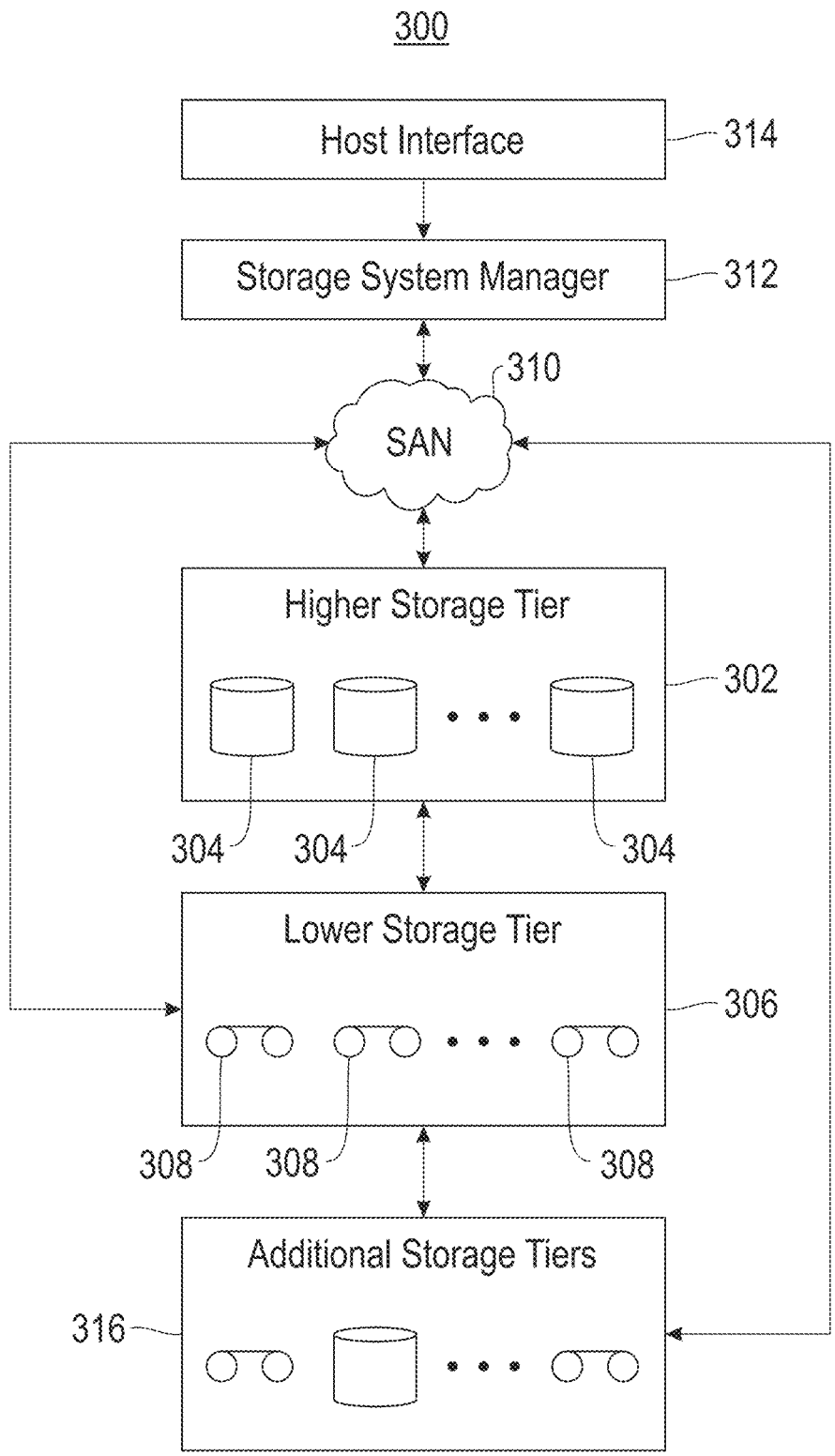
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

Figure 4:
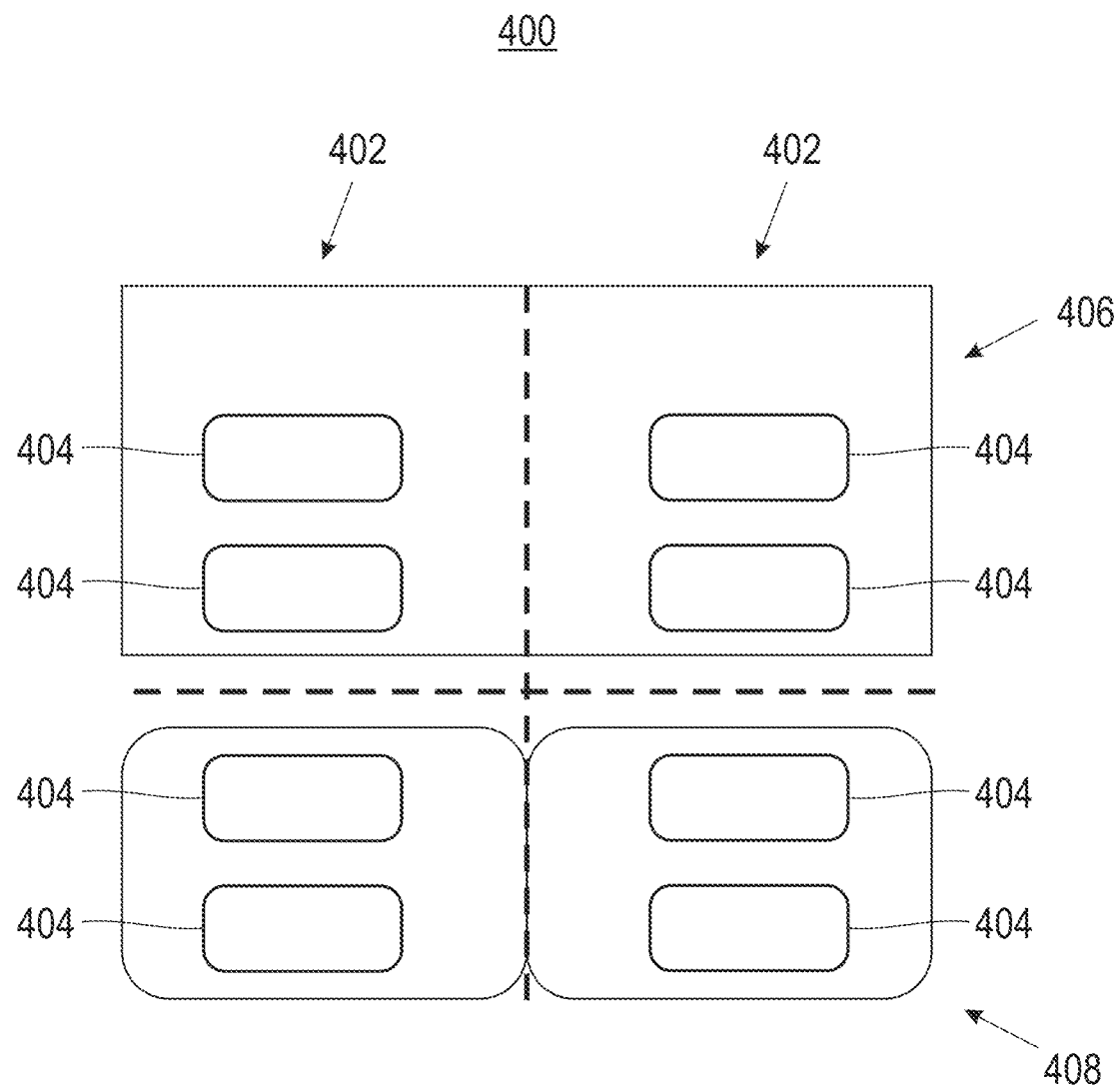
FIG. 4 depicts an arrangement of a plurality of storage blocks across nodes of an in-memory processing system, according to one embodiment of a resilient distributed dataset (RDD).

Referring now to FIG. 4, in one embodiment the presently disclosed inventive concepts may employ a data structure known as a resilient distributed dataset (RDD) 400. RDDs are advantageous for use in in-memory processing applications such as disclosed herein because the data are distributed across a plurality of nodes 402 of the in-memory processing system architecture.

Preferably, data are redundantly stored in a plurality of blocks 404 of each node 402, including blocks on different tiers of storage. For instance, different tiers may include in process memory, in node memory, in node disk, or on another node's memory or disk. More preferably, at least two tiers are employed—an application-level tier 406 which includes at least data loaded into a particular in-memory processing application's memory; and filesystem tier 408, which includes data stored in memory and/or on disk of a filesystem serving the nodes 402 of the in-memory processing system. In particularly preferred approaches, the filesystem tier is embodied as a Hadoop Distributed File System (HDFS) or equivalent distributed filesystem as would be understood by a person having ordinary skill in the art upon reading the present disclosures.

In one embodiment, data stored via an RDD 400 may be efficiently accessed for processing, and the result of such processing transferred to appropriate storage, using caching. As understood herein, caching may include one or more different techniques. For instance, caching may include compression/decompression techniques, may include transferring data from memory to disk (and vise-versa) and/or loading/unloading data to/from a particular application process memory.

Regarding compression, in one embodiment compression and decompression may include serializing and deserializing data, respectively. Serialized data advantageously are characterized by a smaller footprint than corresponding deserialized data, but deserialized data may be processed more efficiently since the deserialized data reflect the data structure and organization of the data, which must be reconstructed in the case of serialized data.

Accordingly, to process serialized data using the in-memory processing application, the data must first be deserialized, detrimentally adding processing time to the overall task of processing the data using the in-memory processing application, in various embodiments.

On the other hand, the increased memory footprint associated with deserialized data consumes more memory, resulting in increased frequency of "spill over" to the processing node's disk cache, which also detrimentally adds I/O and corresponding delay to the overall processing time. In addition, deserialized data are not persistent, and may be lost upon a failure within the in-memory processing system, e.g. a failure of the node, the node memory, etc. as would be understood by a person having ordinary skill in the art upon reading the present disclosures.

Accordingly, preferred embodiments of the presently disclosed inventive concepts will employ compression and decompression in a manner that retains data in serialized format until needed for processing, and decompresses data only as needed for processing to minimize occurrence of spill-over events.

Caching may also include the use of process "heaps." As understood herein, data loaded into a particular application's process memory are considered "in-heap" while data stored in memory but not loaded into a particular application's process memory are "off-heap." Processing data in-heap is the most preferred manner of processing, as data may be processed without incurring any I/O delay. However, of course applications cannot have infinite in-heap memory, so the size of the data set being processed and the hardware components employed in the in-memory processing system will determine the viability of processing data in-heap, in various approaches. In addition, data stored in memory (whether in or off heap) are not persistent, and data loss may occur in event of a failure.

In more approaches, data stored in a RDD may be made persistent via a checkpointing mechanism that stores checkpoints to the filesystem tier 408 at various times, e.g. at predetermined intervals or in response to detecting a trigger condition, which may be predefined by a user configuring the in-memory processing system. In the event of a failure, the checkpoint may be recovered from the filesystem storage, and the data may be restored to the state in which the data existed immediately prior to the failure using lineage information, as would be understood by a skilled artisan upon reading the present descriptions.

As set forth above, caching and checkpointing generally may provide advantages and facilitate efficient data access and processing via one or more of the foregoing approaches, but disadvantageously may generate undesired additional I/O, data processing (e.g. associated with compression/decompression), increased memory usage, and/or loss of data.

Accordingly, the presently disclosed inventive concepts preferably employ a modified approach to caching and checkpointing. In particularly preferred approaches, caching may be performed adaptively using a persistent, memory-centric distributed filesystem. Using a persistent, memory-centric distributed filesystem advantageously allows the implementation of checkpointing techniques at the memory level, reducing the amount of I/O overhead associated with accessing a disk-centric filesystem while conveying the desirable persistence afforded by conventional checkpointing.

In one embodiment, a persistent, memory-centric distributed filesystem such as IBM TACHYON™ may be employed. Of course, any persistent, memory-centric distributed filesystem that a person having ordinary skill in the art would appreciate as equivalent to IBM TACHYON™ in the context of the present disclosures may be employed without departing from the scope of the presently described inventive concepts.

As will be understood by skilled artisans upon reading the instant disclosure, in some embodiments where a persistent, memory-centric distributed filesystem is employed, data may not be replicated to the extent typically found in traditional disk-centric filesystems such as HDFS. For instance, in a disk-centric filesystem data may be stored in triplicate across several nodes, giving three viable locations from which to retrieve the data and increasing the flexibility of node selection for processing, as described in further detail below regarding scheduling. In various embodiments of the presently disclosed inventive concepts, data may be stored only on single node, reducing the flexibility with respect to node selection for processing.

In particularly preferred approaches, the presently disclosed inventive concepts improve the function of in-memory processing systems via employing one or more of a dynamic delay scheduling functionality/component, and an adaptive caching functionality/component.

Dynamic Delay Scheduling

In one embodiment, an in-memory processing system includes a scheduling component configured to schedule jobs on various nodes of the system. The scheduling component preferably takes into account the locality of various nodes with respect to the storage location for the data to be processed in the job. For instance, locality may reflect the relative "distance" between the storage location of the data and the various nodes, with respect to the amount of overhead required to process the data using each of the various individual nodes.

Locality levels, in various approaches, may include "process local," which indicates the data to be processed is in-heap on the node the scheduler is attempting to place the job. Process local nodes are the most preferable processing location as no additional I/O or processing overhead is associated with processing the data using that node, e.g. resulting from loading the data into process memory, from disk, or over a network connection, and/or from decompressing data. Since the data are already present in node memory, processing may proceed without introducing undesirable overhead.

Locality levels may also include "node local," which indicates the data to be processed is stored local to the node upon which processing will be performed. Node local data may be in a memory of the node, e.g. off-heap, or may be stored in a disk, e.g. a disk cache of the node, in various embodiments.

Locality levels may also preferably include "rack local," which indicates that the data are stored on a same physical rack as the node upon which processing may be performed, but not the same node as the node upon which processing may be performed.

Locality levels may also include "any," which indicates no restrictions on the relative distance between the data storage location and the node upon which processing will be performed. Processing data using nodes with a locality level "any" may include any number of I/O and/or processing operations, including network transfers, and therefore is associated with the highest level of overhead introduced to the overall job processing task.

Node level locality is preferred over the rack local and "any" locality levels, but is less preferable than process local, as node local data must be loaded into process memory in order to perform the job. In some approaches, node local data may need to be loaded into memory from disk, introducing some I/O and potentially processing associated with decompression, but advantageously avoiding the need for a network transfer.

Similarly, rack local is preferred over "any" since overhead introduced by transmitting data from a node, disk, memory, etc. located within the same physical rack is generally less than overhead introduced when transmitting data from a node located on a different physical rack, as would be understood by a person having ordinary skill in the art upon reading the present descriptions.

In preferred approaches, the in-memory processing system generally uses a scheduler and attempts to place a particular job on the most local node with respect to the data storage location. In conventional systems, if a job cannot be placed on a node, e.g. because the node is too heavily loaded, then the scheduler will demote a locality parameter associated with the job, permitting the job to be processed on a lower locality level node. However, this approach disadvantageously introduces additional I/O and/or processing associated with transferring the data from disk and/or over a network connection. The conventional approach does not take into account the overhead penalty associated with these operations.

Accordingly, in one embodiment the presently disclosed inventive concepts include a dynamic delay scheduler configured to take into account system overhead generated by conventional scheduling techniques. In preferred embodiments, the dynamic delay scheduler tracks wait time and remote execution time for jobs over time, and maintains a history of wait times and remote execution times.

As understood herein, the remote execution time may be calculated as an average time to complete execution of jobs which were scheduled for processing on a particular node, but were ultimately performed using remote nodes, e.g. due to locality level demotion as discussed above. From this information, it is possible to determine how much overhead is introduced by placing jobs on a low locality level node, rather than processing the jobs on a local node, for the in-memory processing system as a whole. In particularly preferred approaches, the remote execution time is calculated as a moving average of remote execution times across nodes in the in-memory processing system.

Waiting time reflects an amount of time jobs submitted to a particular node are pending and/or processed, e.g. an average amount of time between job submission and job completion for jobs submitted to and processed by a particular node, in one embodiment. In another embodiment, waiting time may be an average amount of time between job submission and initiation of job processing for jobs submitted to and processed by a particular node.

By tracking remote execution time and waiting time, it is advantageously possible to determine a threshold time at which to demote locality of a particular job and tolerate additional overhead associated with performing the job using the lower locality node. Preferably, the threshold may be dynamically adjusted over time to reflect any changes to the efficiency of processing jobs locally versus remotely.

In practice, according to one embodiment a job may be submitted to a local node, but is rejected (e.g. because the node is busy processing other data). In response to detecting the rejection, a predefined delay or timeout is enforced, after which the job is resubmitted to the local node. If the job is again rejected, the predefined delay or timeout is preferably again enforced. This timeout-based iterative process proceeds until the job is successfully submitted, or until a threshold amount of time has passed, after which the locality of the job may be demoted, permitting the job to be submitted to lower locality nodes.

Preferably, the threshold amount of time is based on the remote execution time for the in-memory processing system. For instance, in one approach in response to determining a waiting time for a job exceeds a remote execution time, it is advantageous to demote the locality of the job and permit processing using a lower locality node.

Using the remote execution time as the threshold for demoting locality is particularly advantageous when combined with the dynamic updating functionality described herein, as subsequent jobs submitted to the busy node may be submitted to lower locality nodes without repeating the iterative delay procedure described above. Since the remote execution time is less than the waiting time experienced for the node in question, then a performance increase is realized by skipping the wait process and proceeding directly to lower locality nodes.

In additional approaches, after expiration of an interval between demotion of the first job and the remote execution time, i.e. after an amount of time equal to the remote execution time has elapsed since demoting the first job, the iterative wait process may be resumed to provide additional information regarding system performance and maximize computational efficiency of in-memory processing applications. In still more approaches, the iterative wait process may be skipped only for an immediately subsequent job submitted to the node, and resumed thereafter.

In preferred embodiments, upon determining waiting time exceeds remote execution time, a job may be demoted and submitted to a lower locality node for processing. A subsequent job may be submitted to the node, and upon expiration of a predefined delay (e.g. the first iteration of the iterative wait process described above), the job may be demoted and submitted to a lower locality node to avoid additional delay associated with additional iterations of the wait process, which may be expected to exceed the remote execution time based on detecting the first job's wait time exceeding the remote execution time. Each subsequent job may be similarly handled, until a job is successfully submitted without the predetermined delay elapsing, indicating the node is available for processing jobs locally again. At this point, subsequent jobs may be treated in a similar manner as the first job, and waiting times may be tolerated until a subsequent job again experiences a wait time exceeding the remote execution time.

Accordingly, the waiting time for each node in the in-memory processing system may preferably be updated (e.g. in a record, table, database, etc. maintained by the dynamic delay scheduler) with each job submitted to the node, so that the aforementioned performance advantages may be dynamically achieved using the most recent information regarding performance of the system.

As will be understood by skilled artisans upon reading the present descriptions, for embodiments in which a single replicate of data are stored on a system, and particularly for a memory-centric distributed filesystem, the above dynamic delay scheduling optimizes the processing of jobs by prioritizing locality, and using awareness of the overhead associated with processing jobs using lower levels of locality relative to how much delay a particular node is introducing at present.

Memory-centric distributed filesystems benefit particularly from this approach because the amount of overhead associated with using a remote processing node compared to a local processing node is of much greater significance than the amount of overhead introduced when using a disk-centric filesystem. Skilled artisans will appreciate this is at least partially due to the fact that the overhead associated with transferring data from disk to memory is less than the overhead associated with transferring data over a network connection. Accordingly, even embodiments employing a disk-centric filesystem may benefit from the presently disclosed dynamic delay scheduling, in various embodiments.

With further reference to memory-centric distributed filesystems, and particularly according to embodiments where a level of data replication across nodes of an in-memory processing system are low, especially for embodiments employing a single replicate, it is advantageous to delay scheduling of a particular processing job until the node upon which data to be processed by the particular job become available to avoid replication and thus minimize memory footprint of job processing.

Using dynamic delay scheduling, it is possible in various approaches to estimate a wait time for a particular job to be processed on a particular node, e.g. based on historical waiting times and/or remote execution times. Accordingly, where replication to a remote node is not preferred or possible, it is advantageous to delay processing of the particular job until the node becomes available, minimizing overhead introduced into the overall job processing operations performed by the system.

Adaptive Caching

As mentioned above, caching may be used to improve efficiency of data access, but is associated with corresponding inefficiency with respect to system overhead when caching is not implemented in an adaptive manner. In particular, deserialized data is capable of being processed quickly, but tends to result in spill-over due to expanded memory footprint, while serialized data has a smaller memory footprint but introduces overhead in the process of converting the serialized data into deserialized format for processing.

Accordingly, the presently disclosed inventive concepts include the notion of adaptively adjusting the manner in which data are transformed between serialized and deserialized states while processing a job. Preferably, the transformation is performed selectively, based on the when the data will be needed in deserialized format, an amount of memory available to one or more nodes, and/or an amount of memory available to the system as a whole, in various approaches.

In one embodiment implementing a distributed filesystem, preferably a memory-centric distributed filesystem, data may be stored in serialized format in the distributed filesystem, and stored in deserialized format in process memory.

Preferably, the data may be adaptively transformed from serialized to deserialized format and loaded into process memory based at least in part on analyzing semantics of the in-memory processing application by which the data are to be processed. In particular, semantics of an application script indicating a call to a particular dataset may be located, and in response to detecting the call to the particular dataset, the particular dataset may be deserialized and loaded into process memory.

For example, an application is configured to process data stored in a SQL table. Upon submission of the job, the application script may be analyzed to determine the data required to perform the job, and the SQL table may be implemented as an RDD. So for example, if the job only requires rows where a particular key has a value less than 10, only these rows will be subjected to iterative processing. Since the RDD is partitioned, the entire RDD need not be deserialized and loaded into process memory, only the required rows need be deserialized. Accordingly, it is advantageous to adaptively deserialize only those partitions required by the job to minimize the memory footprint of the job, reducing resource consumption and accordingly spill-over for the system as a whole.

Similarly, and based on application semantics, once a portion of the application requiring the deserialized data completes processing of those data, the partition may be serialized and returned to the distributed filesystem memory. For instance, applications semantics indicating a call to a different data set may indicate a previously called data set are no longer needed in deserialized format, and may be purged from process memory to reduce the overall footprint of the processing job and potentially allow other data to be deserialized for processing which may otherwise have been delayed.

Application semantics may vary according to the purpose of the application, the language in which the application is written, etc. as would be understood by a person having ordinary skill in the art upon reading the present descriptions. In various embodiments, application semantics as referred to herein may encompass any portion of an applications script, application programming interface (API), workflow, etc. that indicates a particular data set will be required to complete processing a pending or in-progress job.

In various embodiments, application semantics may be analyzed using a separate application, e.g. a script configured to parse and interpret a particular scripting language and identify calls to datasets; or by a user to determine which data will be required for a particular processing job. In more approaches, the application by which the data will be processed may expressly pass information to an adaptive caching manager to indicate the datasets that will be required to complete the particular processing job, and the adaptive caching manager may accordingly deserialize and migrate corresponding data to the process memory from the distributed filesystem.

Accordingly, as disclosed herein dynamic delay scheduling facilitates optimum processing of jobs by reducing overhead associated with performing remote processing using low locality nodes, as well as overhead associated with repeatedly waiting for a node to become available even though remote processing would be more efficient under the particular circumstances of the node at that time. Adaptive caching reduces overhead associated with loading unnecessary data into memory, in a deserialized or otherwise decompressed format, which increases the amount and frequency of spillover events. In conjunction the two features of a unified caching and checkpointing technique as disclosed herein thus improve the function of in-memory processing systems.

Figure 5:
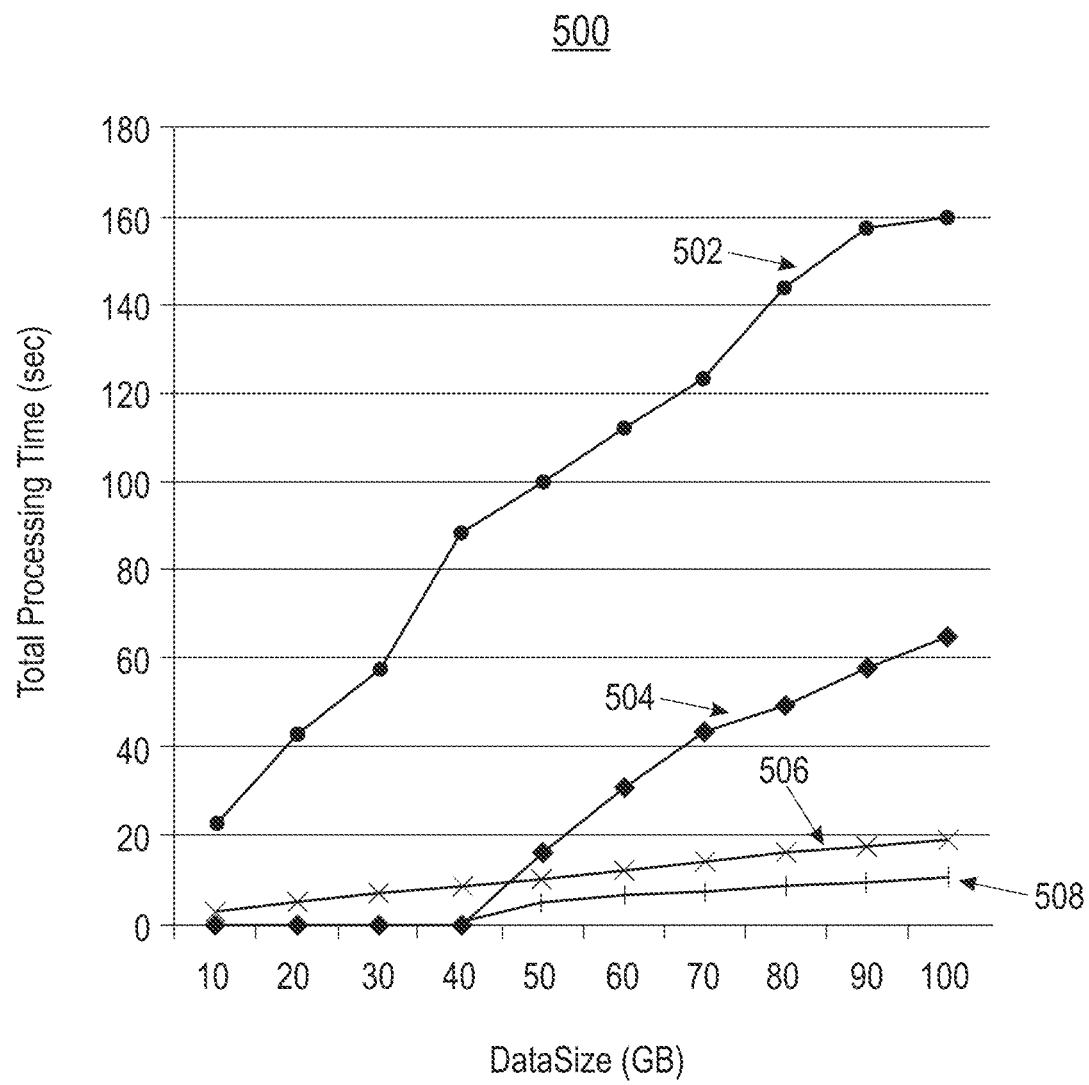
FIG. 5 is a simplified chart comparing performance of conventional in-memory processing schemes with performance of an in-memory processing scheme according to one embodiment of the presently disclosed inventive concepts.

For instance, and as demonstrated via the chart depicted in FIG. 5, relative performance of an in-memory processing system using conventional checkpointing (curve 502), an in-memory processing system using conventional caching and processing deserialized data (curve 504), an in-memory processing system using conventional caching and processing serialized data (curve 506), and an in-memory processing system implementing dynamic delay scheduling and adaptive caching as disclosed herein (curve 508) are shown, according to one embodiment.

As can be seen from curve 508, implementing an in-memory processing application in conjunction with dynamic delay scheduling results in up to a nine-fold reduction in average processing time compared to conventional techniques using a distributed, memory-centric filesystem without dynamic delay scheduling (i.e. relying on conventional checkpointing), according to the exemplary embodiment represented by FIG. 8.

Similarly, implementing adaptive caching as disclosed herein results in an approximately six-fold reduction in average processing time as compared to an in-memory processing system processing deserialized data using conventional caching, and an approximately two-fold reduction compared to an in-memory processing system processing serialized data using conventional caching.

Notably, the performance improvement is drastically better for datasets having a size less than a size at which spill over occurs (e.g. data sets having a size of 40 GB or less as shown in FIG. 5), since the presently disclosed adaptive caching techniques enable the system to avoid spillover and thus can process the job using deserialized data without associated overhead detriments. Even when spillover occurs (as indicated by the knee in the curve at approximately 40 GB dataset size), performance improvements are retained. Though the partially deserialized dataset introduces some I/O overhead to the process, adaptive caching reduces the amount of overhead by a factor of two, representing an improvement over conventional in-memory processing techniques.

As discussed above, adaptive caching has been described in the exemplary context of serialized and deserialized data formats. As will be understood by a person having ordinary skill in the art upon reading the present descriptions, the adaptive caching techniques disclosed herein are equally applicable to other forms of data compression, as well as other techniques for converting data from one format to another, even if for purposes other than compression.

Figure 6:
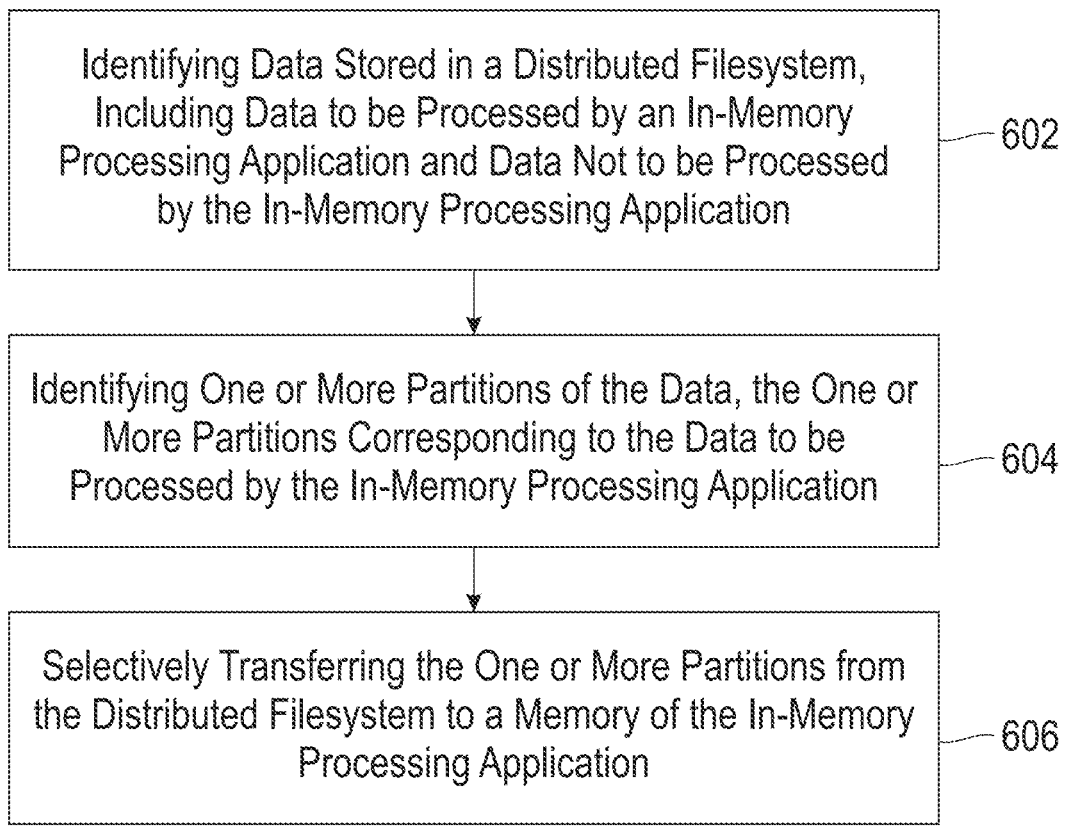
FIG. 6 is a flowchart of a method, according to one embodiment.

Now referring to FIG. 6, a flowchart of a method 600 for adaptively caching datasets in an in-memory processing system is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a dynamic delay scheduler of an in-memory processing system, an adaptive caching manager of an in-memory processing system, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where data stored in a distributed filesystem are identified, the data including data to be processed by an in-memory processing application and data not to be processed by the in-memory processing application.

In operation 604, method 600 includes identifying one or more partitions of the data, the one or more partitions corresponding to the data to be processed by the in-memory processing application.

Operation 606 of method 600 includes selectively transferring the one or more partitions from the distributed filesystem to a memory of the in-memory processing application.

Of course, in various embodiments method 600 may include any number of additional and/or alternative features, functions, operations, etc. as described herein.

The method 600 may additionally and/or alternatively deserializing the one or more partitions as part of the process of loading the data into in-process memory.

Identifying the data stored in the distributed filesystem and identifying the one or more partitions is preferably based at least in part on analyzing semantics of the in-memory processing application, in some approaches.

Moreover, analyzing semantics of the in-memory processing application may include identifying one or more application calls to the data stored in the distributed filesystem. The analyzing may be performed by a human user, and/or the in-memory processing application may provide the semantics to the user or an adaptive caching manager of the in-memory processing system, e.g. for automated processing.

The method 600 may also include selectively transferring the one or more partitions from the memory of the in-memory processing application to the distributed filesystem based on analyzing semantics of the in-memory processing application.

The computer-implemented method 600 may include serializing the one or more partitions as part of the process of transferring the data from in-process memory to the distributed filesystem, in some embodiments.

Figure 7:
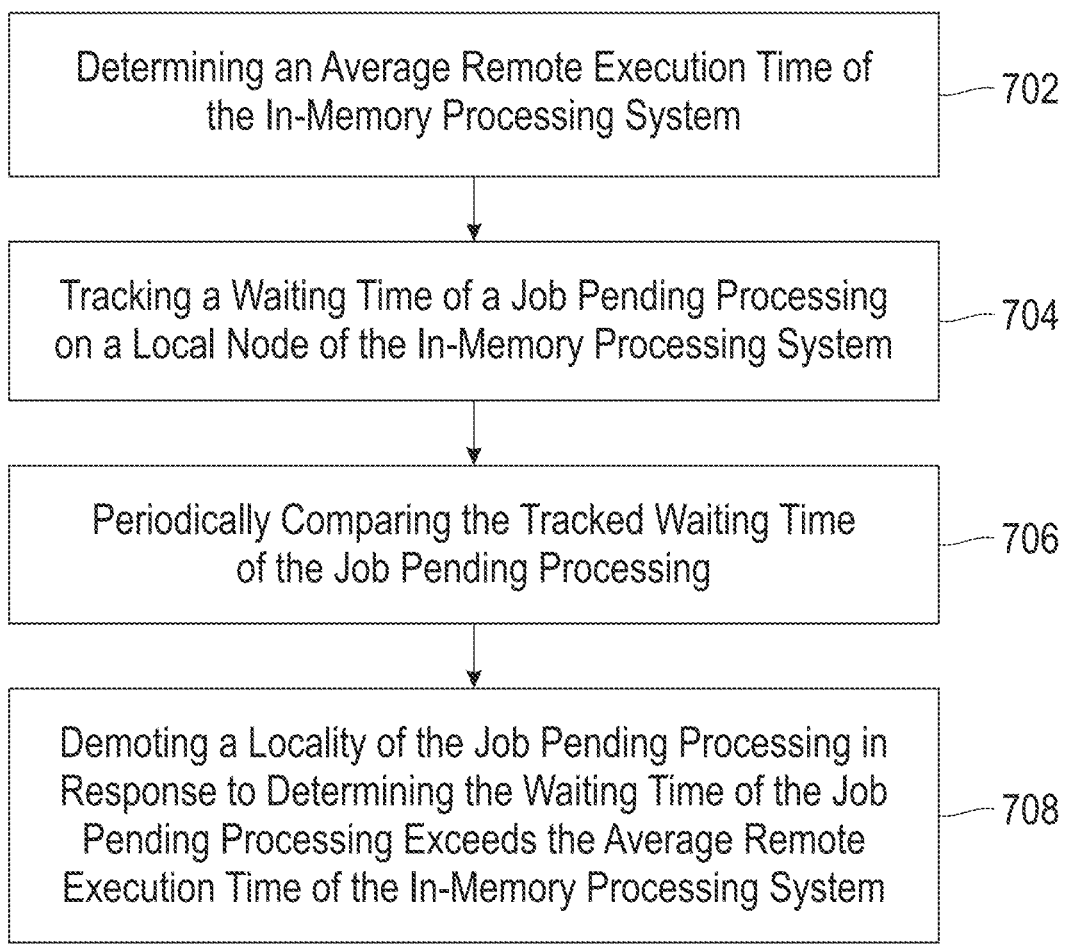
FIG. 7 is a flowchart of a method, according to one embodiment.

Now referring to FIG. 7, a flowchart of a method 700 for dynamic delay scheduling of jobs using an in-memory processing system is shown according to one embodiment. The method 700 may be performed in accordance with the present invention in any of the environments depicted in FIGS. 1-5, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a dynamic delay scheduler of an in-memory processing system, an adaptive caching manager of an in-memory processing system, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where an average remote execution time of the in-memory processing system is determined.

Method 700 also includes operation 704, in which a waiting time of a job pending processing on a local node of the in-memory processing system is tracked.

Method 700 also involves periodically comparing the tracked waiting time of the job pending processing in operation 706.

In addition, demoting a locality of the job pending processing in response to determining the waiting time of the job pending processing exceeds the average remote execution time of the in-memory processing system is performed in operation 708.

Of course, the method 700 may be implemented via a computer and include one or more additional and/or alternative operations, features, etc. as described herein. For instance, in one approach the method 700 may include transferring the job to a remote node characterized by a lower locality than the local node based on the demoted locality of the job pending processing. The locality is preferably selected from: node-local, rack-local and any.

Method 700 may additionally and/or alternatively include tracking a waiting time of a subsequent job pending processing on the local node; determining the subsequent job remains pending processing on the local node after a predetermined interval; and/or demoting a locality of the subsequent job in response to determining the job remains pending processing on the local node after the predetermined interval. Preferably, the predetermined interval is a period of time less than the average remote execution time of the in-memory processing system.

In more embodiments, the average remote execution time of the in-memory processing system is a moving average of execution times for jobs submitted to one or more nodes of the in-memory processing system which are remote from data submitted for processing to the one or more nodes.

In still more embodiments, method 700 may include estimating a wait time of the job pending processing on the local node based on one or more historical waiting times for the local node, and one or more historical remote execution times for the in-memory processing system.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for adaptively caching datasets in an in-memory processing system, the method comprising:
    identifying data stored in a distributed filesystem, including data to be processed by an in-memory processing application and data not to be processed by the in-memory processing application;
    identifying one or more partitions of the data, the one or more partitions corresponding to the data to be processed by the in-memory processing application;
    selectively transferring the one or more partitions from the distributed filesystem to a memory of the in-memory processing application; and
    selectively transferring the one or more partitions from the memory of the in-memory processing application to the distributed filesystem based on analyzing semantics of the in-memory processing application.

2. The computer-implemented method of claim 1, comprising scheduling one or more jobs across a plurality of nodes of the in-memory processing system, wherein the scheduling is based at least in part on a locality of the nodes with respect to a storage location of the data to be processed.

3. The computer-implemented method of claim 1, wherein the identifying the data stored in the distributed filesystem; and the identifying the one or more partitions are each based at least in part on analyzing semantics of the in-memory processing application; and wherein the semantics comprise a portion of an applications script, and/or an application programming interface (API).

4. The computer-implemented method of claim 3, wherein analyzing the semantics of the in-memory processing application is performed by an adaptive caching manager, and comprises identifying one or more application calls to the data stored in the distributed filesystem.

5. The computer-implemented method of claim 4, comprising providing the semantics to an adaptive caching manager of the in-memory processing system, wherein the adaptive caching manager reduces an amount of overhead on the in-memory processing system by a factor of two.

6. The computer-implemented method of claim 1, comprising selectively transferring the one or more partitions from the memory of the in-memory processing application to the distributed filesystem based on analyzing semantics of the in-memory processing application; and wherein the semantics comprise a portion of an applications script, and/or an application programming interface (API).

7. An in-memory processing system for adaptively caching datasets, comprising:
a processor; and
logic executable by the processor to cause the processor to;
identify data stored in a distributed filesystem, the data including data to be processed by an in-memory processing application and data not to be processed by the in-memory processing application;
identify one or more partitions of the data, the one or more partitions corresponding to the data to be processed by the in-memory processing application;
selectively transfer the one or more partitions from the distributed filesystem to a memory of the in-memory processing application; and
selectively transfer the one or more partitions from the memory of the in-memory processing application to the distributed filesystem based on analyzing semantics of the in-memory processing application.

8. The in-memory processing system of claim 7, comprising logic executable by the processor to cause the processor to:
selectively deserialize the one or more partitions; and
selectively serialize the one or more partitions; and
wherein the one or more partitions are selectively deserialized and selectively serialized based at least in part on: a time at which the data will be needed in deserialized format, an amount of memory available to one or more nodes of the in-memory processing system, and/or an amount of memory available to the in-memory processing system as a whole.

9. The in-memory processing system of claim 7, wherein each of:
identifying the data stored in the distributed filesystem; and
identifying the one or more partitions;
are based at least in part on analyzing semantics of the in-memory processing application; and
wherein the semantics comprise a portion of an applications script, and/or an application programming interface (API).

10. The in-memory processing system of claim 9, wherein analyzing the semantics of the in-memory processing application comprises identifying one or more application calls to the data stored in the distributed filesystem using a script configured to parse and interpret a scripting language used by the in-memory processing application.

11. The in-memory processing system of claim 10, comprising logic executable by the processor to cause the in-memory processing application to provide the semantics to an adaptive caching manager of the in-memory processing system.

12. A computer program product for adaptively caching datasets in an in-memory processing system, the computer program product comprising a computer readable storage medium having program instructions embodied therewith, wherein the computer readable storage medium is not a transitory signal per se, and the program instructions are executable by a processor, to cause the processor to perform a method comprising:
identifying data stored in a distributed filesystem, including data to be processed by an in-memory processing application and data not to be processed by the in-memory processing application;
identifying one or more partitions of the data, the one or more partitions corresponding to the data to be processed by the in-memory processing application; and
selectively transferring the one or more partitions from the distributed filesystem to a memory of the in-memory processing application; and
selectively transferring the one or more partitions from the memory of the in-memory processing application to the distributed filesystem based on analyzing semantics of the in-memory processing application.

13. The computer program product of claim 12, comprising program instructions executable by the processor, to cause the processor to: selectively serialize and/or deserialize the one or more partitions based at least in part on: a time at which the data will be needed in deserialized format, an amount of memory available to one or more nodes of the in-memory processing system, and/or an amount of memory available to the in-memory processing system as a whole.

14. The computer program product of claim 12, wherein the identifying the data stored in the distributed filesystem; and the identifying the one or more partitions are each based at least in part on analyzing semantics of the in-memory processing application; and
wherein the semantics comprise a portion of an applications script, and/or an application programming interface (API).

15. The computer program product of claim 14, wherein analyzing the semantics of the in-memory processing application comprises identifying one or more application calls to the data stored in the distributed filesystem.

16. The computer program product of claim 15, comprising program instructions executable by the processor, to cause the processor to: provide the semantics to an adaptive caching manager of the in-memory processing system.

17. The computer-implemented method as recited in claim 2, wherein the locality of each node with respect to the storage location of the data to be processed is selected from a group consisting of: process local, node local, rack local, and any.

18. The computer-implemented method as recited in claim 2, wherein the scheduling reduces average processing time by a factor of nine relative to processing the data using a distributed, memory-centric filesystem lacking a locality-based scheduling capability.

* * * * *